Patented Mar. 5, 1935

1,993,037

UNITED STATES PATENT OFFICE 1,993,037

REACTION PRODUCT OF CINEOL AND MALEIC ANHYDRIDE AND PROCESS OF MAKING IT

Edwin R. Littmann, Wilmington, Del., assignor to Hercules Powder Company, Wilmington, Del., a corporation of Delaware No Drawing. Application November 10, 1932, Serial No. 642,029

12 Claims. (Cl. 260—123)

This invention relates to a new compound comprising the reaction product of cineol and maleic anhydride and method for its production. The reaction product in its crude state is found to be of a more or less resinous nature. The crude product may be readily refined and when refined will be found to be a light colored, waxy solid having crystalline properties. In carrying out the method contemplated by this invention, maleic anhydride and cineol may be reacted under any suitable condition. The reaction may be carried out in the presence of heat and will be carried out in the presence of a catalyst. If desired, an agent may be used which will aid in the removal of water of reaction from the reaction mass.

As illustrative of practical procedure, the reaction may be carried out, for example, at a temperature within say about the range 120-200° C. In proceeding, as has been indicated, the reaction will be carried out in the presence of a catalyst. Where a catalyst is used, such may be any suitable catalyst, as for example, an acidic catalyst such as zinc chloride, aluminum chloride, p-toluene sulphonic acid, or organic acids such as acetic, benzoic, or even maleic acid itself, etc. In proceeding, maleic anhydride, as such, may be used or equivalently maleic acid or fumaric acid or mixtures thereof may be used in equivalent amounts. It will be understood that maleic and/or fumaric acid, or mixtures thereof, will, in the course of the reaction, be converted into maleic anhydride and that they may be used equivalently for maleic anhydride as such.

With reference to the catalyst, it will be appreciated that essentially an acidic substance is present to catalyze the reaction. Hence maleic acid, if used at the start of the reaction, will serve not only as a source of maleic anhydride but will provide a suitable catalyst, or if maleic anhydride be used at the start and the water of reaction be not permitted to escape during the first part of the reaction maleic acid will be formed and will catalyze the reaction. While such will be the equivalent of the use of a foreign catalyst it will be preferable to use a foreign catalyst.

When it is desired to use an agent to aid in the removal of water of reaction, for example, xylene, toluene, or the like, may be used as such agent and may be used in amount within, for example, about the range 100-500% of the amount of maleic anhydride. In practical procedure the cineol and maleic anhydride may be reacted in molar proportion where the reaction is carried out in the presence of a catalyst. If desired, an excess of cineol or of maleic anhydride may be used, the excess being recovered unreacted, since the two reactants will react in molar proportion.

In practical procedure after completion of the reaction volatile substances will be removed from the reaction mass, as, for example, by steam distillation, for example, at a temperature of about 100° C. under atmospheric pressure and the residue will then be dried or dehydrated, as, for example, by the application of heat or through the use of, for example, calcium chloride, sodium sulphate, or the like. As has been indicated, the crude product thus obtained will be a more or less resinous product which may be readily refined, for example, by distillation under reduced pressure. Thus, for example, the crude product may be refined by distilling at a temperature say within the range 140° C.–160° C. within about the range 1–5 mm. mercury.

In practical procedure, as has been indicated, an agent which will aid in the removal of water of reaction will be used and as more specifically illustrative the reaction may be efficiently carried out by refluxing the reactants in the presence of a catalyst under conditions which will permit of the removal of water and return of the non-aqueous ingredients to the reaction mass.

As illustrative of the carrying out of the method for the preparation of the new composition in accordance with this invention, for example, a mixture of 30.8 parts of cineol, 20 parts maleic anhydride, 10 parts of xylene and 0.5 parts zinc chloride is refluxed for about 20 minutes at a temperature of about 140° C. In the refluxing water vapor is permitted to pass on while the non-aqueous vapors are condensed and returned to the reaction mass. On completion of the reaction the mixture will be steam distilled at say a temperature of about 100° C. and under atmospheric pressure in order to free it from volatile substances. The residue will then be dried or dehydrated, for example, by heating at a temperature of about 100–150° C. The crude product thus obtained may be refined for the production of a very light colored, waxy solid having crystalline properties by distilling under reduced pressure, say, for example, distilling at a temperature of about 133° C. under a pressure of about 1.0 mm. mercury.

As a further illustration of the practical carrying out of the method embodying this invention, for example, a mixture of 77.5 parts of cineol, 58 parts of maleic acid, 10 parts of zinc chloride, 200 parts of toluene is distilled in such manner as to remove water formed during the reaction and return the non-aqueous distillate to the reaction mass. Distillation may, for example, be at a temperature of about 130° C. with use of a fractional condenser, which will permit the water vapor to pass on. After completion of the reaction the reaction mass will be steam distilled at a temperature of say about 100° C. under atmospheric pressure to remove volatile substances and the residue dried, for example, by the use of calcium chloride. The crude product may then be distilled under reduced pressure for its refinement.

It will be understood that the examples above are given for illustrative purposes only, it being understood that the details of procedure in accordance with this invention may be widely varied over those given above. Thus, for example, it will be understood that it is not intended that this invention shall be limited to the use of any particular temperatures and pressures, or to the use of any particular catalyst.

Further, the use of an agent to aid in the removal of water formed during the reaction, as toluene, xylene, or the like, is not essential.

It will be understood that the use of maleic acid or fumaric acid, or mixtures thereof in equivalent amounts is contemplated as fully equivalent to the use of maleic anhydride as such.

The product, as has been indicated, will, when refined, be a light colored, waxy, solid having crystalline properties and of an acidic nature rendering it available for reaction with, for example, alcohols for the formation of products variously usable in the commercial arts.

Thus, the product may be used for the formation of esters adaptable for use as solvents and plasticizers by reaction with monohydric alcohols and again by reaction with polyhydric alcohols the product will form resins or resinous products suitable for protective coatings.

What I claim and desire to protect by Letters Patent is:

1. A method for the production of a compound which includes heating cineol with maleic anhydride.

2. The method for producing a compound which includes heating cineol with maleic anhydride at a temperature of about 120° C. to about 200° C.

3. The method for producing a compound which includes heating cineol with maleic anhydride in the presence of an acidic catalyst.

4. The method for producing a compound which includes heating cineol with maleic anhydride in the presence of an agent which will aid in the volatilization of water of reaction.

5. The method for producing a compound which includes heating cineol and maleic anhydride and distilling off volatile unreacted ingredients of the reaction mixture on completion of the reaction.

6. The method for producing a compound which includes heating cineol and maleic anhydride, distilling off volatile portions of the reaction mixture on completion of the reaction, drying the residue and subjecting the residue to vacuum distillation.

7. The method for producing a compound which includes heating cineol and maleic anhydride in the presence of an acidic catalyst and removing water formed during the reaction.

8. The method for producing a compound which includes heating cineol and maleic anhydride in the presence of an acidic catalyst and distilling off volatile portions of the reaction mixture on completion of the reaction.

9. The method for producing a compound which includes heating cineol with maleic anhydride at a temperature within about the range 120-200° C. in the presence of an acidic catalyst.

10. A compound comprising a chemical combination of maleic anhydride and cineol.

11. The method for producing a compound which includes heating cineol and maleic anhydride while simultaneously removing water formed during the reaction.

12. The method for producing a compound which includes heating an excess of cineol with maleic anhydride at a temperature of about 120° C. to about 200° C.

EDWIN R. LITTMANN.